United States Patent [19]

Caimi et al.

[11] Patent Number: 5,418,608
[45] Date of Patent: May 23, 1995

[54] THREE DIMENSIONAL MAPPING SYSTEMS AND METHODS

[75] Inventors: Frank M. Caimi, Vero Beach; David C. Smith, Ft. Pierce, both of Fla.

[73] Assignee: Harbor Branch Oceanographic Institution Inc., Ft. Pierce, Fla.

[21] Appl. No.: 56,764

[22] Filed: May 4, 1993

[51] Int. Cl.⁶ .................... G01C 3/00; G01B 11/26
[52] U.S. Cl. .................... 356/3.01; 348/139; 348/146; 356/141.1
[58] Field of Search .............. 356/5, 152, 141, 1, 356/141.1; 348/135, 138, 146, 139

[56] References Cited

U.S. PATENT DOCUMENTS

| | | | |
|---|---|---|---|
| 3,604,803 | 9/1971 | Kahn | 356/5 |
| 4,935,616 | 6/1990 | Scott | 356/5 |
| 5,114,226 | 5/1992 | Goodwin et al. | 356/5 |
| 5,200,793 | 4/1993 | Ulich et al. | 356/5 |
| 5,270,780 | 12/1993 | Moran et al. | 356/5 |
| 5,323,223 | 6/1994 | Hayes | 356/5 |

Primary Examiner—Stephen C. Buczinski
Attorney, Agent, or Firm—Carroll F. Pulmer

[57] ABSTRACT

A system for three dimensional mapping of a submarine surface includes (a) a light source for projecting a beam of collimated light that is reflective from the submarine surface including a laser of confined cross-sectional area, (b) a scanning unit to intercept the beam and project it in a first direction onto a selected area of the surface as a raster of pixels each at controlled X and Y coordinates of said surface and produce a reflection of the raster in a second direction, (c) a scanner processor to control the X and Y coordinates, (d) a compound lens capable of intercepting the raster reflection and focusing it as a scan image on a reception plane offset spatially from the scanning unit, (e) a position sensitive detector having a planosurface positioned substantially on the reception plane to sense the scan image and convert each pixel of the reflected raster into a pair of differential currents corresponding to the X and Y coordinates of the each pixel at said reception plane, (f) a signal processor to calculate from the differential currents range value voltages for the pixels, and (g) graphic display unit to convert the range value voltages into a visual representation of the scanned surface.

16 Claims, 5 Drawing Sheets

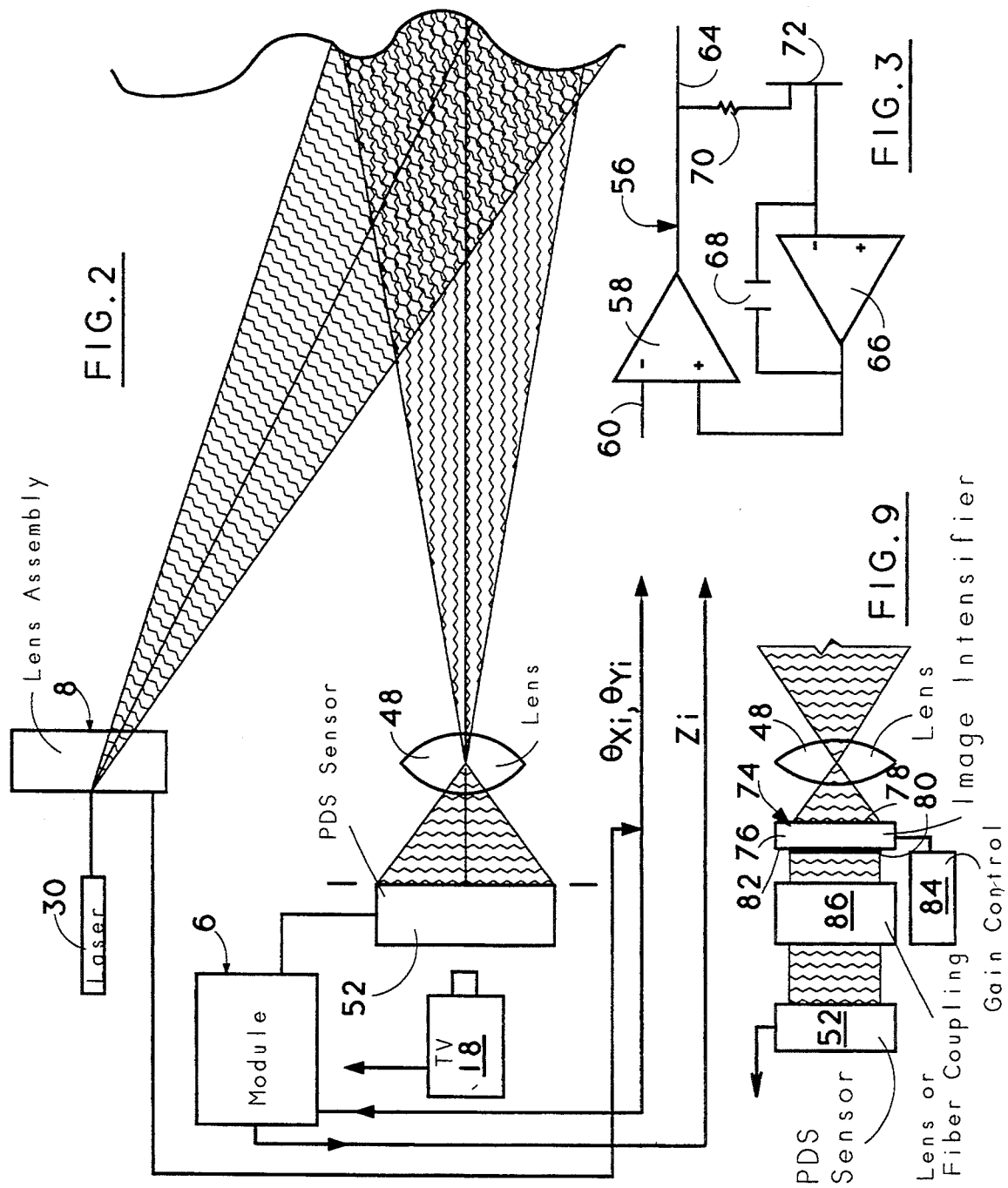

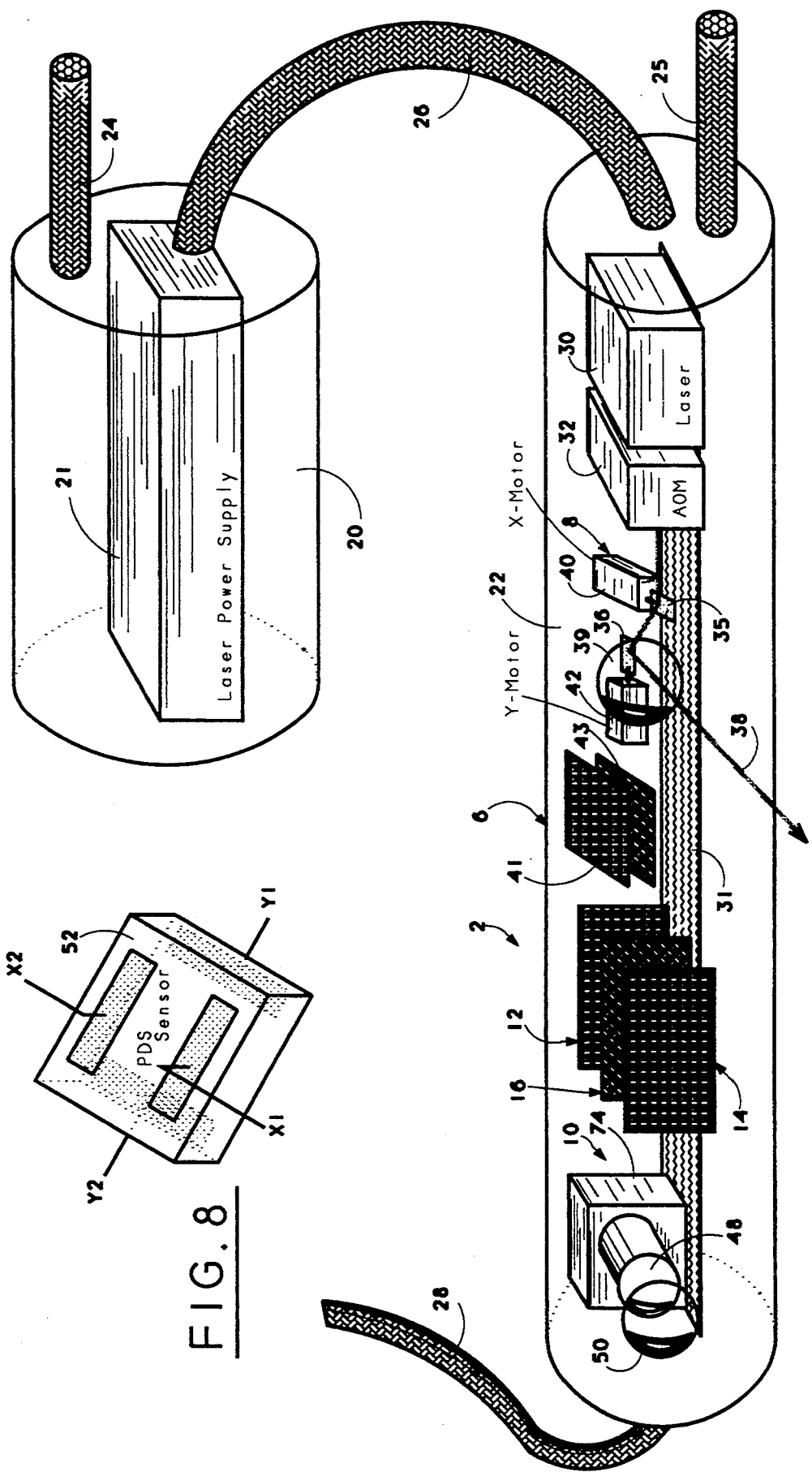

THREE DIMENSIONAL MAPPING SYSTEMS AND METHODS

BACKGROUND OF THE INVENTION

1. Field of the Invention

This application relates to three dimensional mapping systems and methods. More particularly, it concerns methods for providing 3D profiles of surfaces from a remote position, particularly in submarine locations, and new systems for obtaining such profiles without requiring use of complex image processing hardware.

2. Description of the Prior Art

Submarine searches, research, investigations and like operations present a host of problems unrelated to terrestrial activities. Since much of such submarine work must be accomplished in personnel operated submarines or remotely operated vehicles (ROVs) that isolate data gathering entities from relevant marine objects or surfaces, there is a continuing demand for advanced underwater systems and methods for ranging, size estimation, profiling, mapping, etc. (see U.S. Pat. Nos. 4,777,501; 4,914,460 and 4,948,258). The present invention provides improved systems and methods to help meet this demand.

Laser photogrammetric technology has been extensively applied to solving problems associated with submarine activities as mentioned above. However, laser photogrammetric systems used for marine research and other submarine work have typically been limited to those having only several sampling beams or points. Reasons for this trend involve tradeoffs between design parameters, such as available laser power, background illumination, camera response and the complexity of the signal interpretation scheme. In those applications where surfaces or objects are rough or where multiple objects are present, more thorough sampling is desirable to obtain accurate photogrammetric estimates. Simple continuous laser illumination spread into multiple beams becomes difficult to observe and differentiate in a typical video frame. Conversely, stripe illumination eliminates ambiguity in identifying specific structured lighting elements, but is difficult to handle using conventional processing methods. As a result, systems based on video cameras are less desirable (as opposed to specialized detection and scanning systems) when a large number of mapping elements is required. Exceptions include shape from shading methods, stereovision, and video moiré techniques (see Blatt, Hooker & Caimi, *Optics and Lasers in Engineering*, March, 1992, pp. 265-278).

A limiting factor in all conventional imaging systems has been operation at extended ranges or in turbid water because of scattered light from suspended particles or water molecules within the common volume defined by the field of view of the detector and the field of illumination from the light source. This scattered light reduces the apparent contrast of the scene being viewed in conventional imaging systems resulting in a decrease in accuracy of any range estimate. The present invention addresses this limitation problem and provides a unique solution therefor.

In spite of the extensive prior work and developments with underwater systems for ranging, mapping, etc. as noted above, substantial improvements are needed to further advance 3D mapping of submarine surfaces and objects.

OBJECTS

A principal object of the invention is the provision of new methods for providing 3D profiles of surfaces from a remote position and new systems for obtaining such profiles without requiring use of complex image processing hardware.

Further objects include the provision of:

1. Improvements in such systems and methods particularly suited to 3D mapping in submarine locations.
2. Such 3D mapping systems and methods that are not limited to operation in clear water, but may be capable of use in turbid or dirty water.
3. Such 3D mapping systems and methods that meet or exceed current marine work demands using a single scanning laser and a position sensitive detector as the principal sensor.
4. Such new systems whose limits on accuracy are more than met by their stability and resolution capabilities and by the mechanical simplicity of their scanning components.
5. New 3D mapping systems and methods characterized by improved range and/or resolution capabilities, higher speed in effecting a 3D scan and the ability to screen out scattered light.
6. New 3D scanning systems and methods capable of resolving 1 mm relief at a nominal range of 1-2.5 meters in waters with beam attenuation constants of 0.5/m or less, i.e., attenuation corresponding to coastal or bay water turbidity (clarity).
7. Such new systems and methods that increase the sensitivity of the position sensing component and reduce backscattered light field intensity for a given degree of water turbidity (scattering function).
8. New systems and methods useful in the inspection of hulls of ships and pipelines.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished, in part, in accordance with the invention by the provision of a three dimensional, submarine, mapping system capable of providing up to a 800 by 800 point angular scan across a selectable area resulting in a resolution of better than 1 millimeter at a nominal 1 meter standoff distance from a test surface. The system is suited for ROV use and can complete a scan of a ±20 by ±20 degree angular field in less than 4 seconds. Using the new system, an image of a test wedge located at a 1 meter nominal range when scanned accurately indicates each step of the wedge incremented by 1 millimeter in range from a nominal 1 millimeter step at the center.

The broad angular field of the new system and the excellent resolution can be traded for higher scan speed, which in some embodiments can approach video rates. Alternately, image amplification can be employed in its detector component using image intensifiers to further increase the scan speed and range.

Advantages of using image intensifiers in systems of the invention are several, namely, (a) enables increase in range/standoff distance, (b) decreases laser power needed for illumination, (c) increases scan speed and (d) reduces turbidity effect (vieling illuminance due to scattered light) made possible by the intensifier's range gating capability and/or synchronous scan geometry.

In typical systems of the invention, a single high powered laser (approximate wavelength 532 nm) projects a single beam to produce a single dot image reflection at the target surface. The dot is scanned in a raster fashion via two synchronously driven mirrors, one for each of the X and Y axes. Such mirrors are positioned under user control to exactly define the scan boundaries, frequency, and density. This two dimensional scan will coincide with the field of view of the lens/detector unit (sensor) of the system and a standard NTSC video camera to provide a visual reference. The deviation between the actual position of the dot on the sensor and a predetermined reference position provides a range measure via triangulation.

In such preferred embodiment, the detector component of the sensor is a commercially available, off-the-shelf, lateral effect, position sensitive photodiode (PSD) assembly, such as the United Detector Technology DLS10, positioned to encompass the entire field of view (FOV) of the sensor. Such linear sensor produces two differential currents (one for each axis) based on the position and intensity of the reflected laser dot.

The sensor in combination with a custom designed analog amplifier normalizes for intensity and provides X and Y coordinates as currents (from 0 v to 10 v) accurate to 0.1% of the sensor active width along the X & Y axes, respectively. This is the equivalent of 1000+ video lines. PSD response times of 0.2-2.0 microseconds are typical, allowing the entire scan to be completed in less than a 4 second desired frame time. Considering a total angular field of 40°×40°, a 3" aperture lens can provide enough light gathering ability to achieve minimum response time and adequate signal to noise at the PSD amplifier when using a 100 mW Nd:YAG laser for illumination.

Since the new mapping systems require only a single laser beam, this greatly reduces complexity of the illumination system, with resulting increase in reliability and ease of alignment. It also significantly reduces the power dissipation required for any given working distance or turbidity condition.

A video camera may be used in the new mapping systems to serve simply as an auxiliary sensor and would have no specific requirements as to resolution, sensitivity, or scan accuracy. When the system is used in conjunction with a submarine ROV, the video signal will be carried on a coaxial cable to the surface for viewing, recording, and/or digitizing as desired, but the sole source of information on the 3D mapping will be the signals (representing x,y coordinates) from the detector, in addition to scan signals indicative of the scan angles $\theta_x, \theta_y$.

In order to minimize communication overhead, the new mapping systems preferably use a single board computer for the downlink controller. This greatly simplifies the design and implementation of communications between the uplink and downlink modules. It further permits significant and complex tasks to be carried out by the downlink module with minimum instruction from the surface.

In a specific embodiment, the mapping system was comprised of a 80486 33 Mhz with 16 MBytes of RAM, a fast 300 MByte disk combined with an off the shelf PC card to perform the analog to digital conversion on the PSD signal. The speed and computational power of the 486 is desirable to provide the resolution required in the time allowed. The large disk allows for storage of potentially large 3D data files. At the highest specified lateral resolution of 0.05", the data file would occupy nearly 8 MBytes per scan frame. The large disc also will be adequate for storing digitized video frames in the event that it is desirable to make precise data comparisons.

Advantageously, the hard disk is controlled by a SCSI device driver. This configuration offers the highest speed, greatest throughput, and expandability. The system may also have a removable storage capacity that is both significant and flexible, e.g., a 120 MByte tape drive as well as standard format floppy drives (5¼" and 3½"). The tape permits the transfer of data files larger than 1.44 MBytes, and facilitates efficient maintenance of system backup. The dual floppy drives offer a flexible path for transferring small files (data and executable) to and from any other system. These three storage devices provide the system with capability of handling almost any storage and compatibility requirements.

An optical disk drive (600+ MBytes) may be provided as an option for additional storage.

The new mapping systems provide further advantages over prior known, related systems. First, the scanning laser/photo diode sensor can be optically filtered to view a narrow spectrum corresponding to the laser source virtually eliminating the computational load of discriminating laser light from ambient. Second, connectivity determination in the image is not necessary because there is one laser dot present during each sample interval. The exact hypothetical coordinates of each dot are compared to the actual coordinates coming from the PSD and computation is limited to basic trigonometry. While the new PSD system is slower to respond than prior known video devices, there is a significant reduction in processing time to obtain the position of the laser reflection. Sensors and amplifiers commercially available running at 30 KHZ can accomplish objectives of the invention in approximately 2 seconds, but are not sensitive enough to operate at the specified range or standoff distances. A custom designed amplifier is provided to meet the range requirements.

In order to increase the range at which the new systems can provide accurate range estimates, the invention provides for increasing the sensitivity of the position sensing device and for reducing the backscattered light field intensity for a given water turbidity. This can be done in several different embodiments.

In preferred embodiments, range gating is used to block light from reaching the PSD until a return from the target is expected. This requires a crude estimate of the distance or range to the datum surface in order to enable the PSD at the appropriate time corresponding to the round trip delay time of light from the light source (laser) to the datum surface and from that surface to the PSD. Two components provide this capability, namely (1) a shutter or gating circuit with a response time faster than the round trip delay time and (2) a pulsed light source that produces sufficient energy to produce a detectable return from the datum surface, but is sufficiently short in duration not to occupy the entirety of the scattering volume during the time that the shutter or gate is open. In such a system, the shutter or gate will screen light originating from the scattering particles as they will not be illuminated during the time the shutter or gate is open. This type operation is the range gating mentioned above.

Range gated systems using pulsed laser sources are identified under the acronym LIDAR for light detection and ranging. Such systems can provide imaging capability in excess of six attenuation lengths, as compared with conventional ranging systems which operate at 2-3 attenuation lengths. Range accuracy is determined by the pulse response of the range gated system and is difficult to obtain below one nanosecond. Since light travels at about 1.33 nanoseconds per foot in water, range accuracies of better than nine inches are difficult to obtain. In contrast to prior known systems and methods, the present invention utilizes range gating only to eliminate scatter light input, but relies upon triangulation methods to obtain improved range determinations.

In prior known LIDAR systems, gating is typically achieved by applying a voltage to a gating electrode of a photomultipler tube or microchannel plate amplifier. In accordance with this invention, a microchannel plate image amplifier is used to amplify the one or two dimensional light signal reflected onto the PSD from the datum surface. The amplified light signal is then imaged or otherwise coupled onto a lateral effect photodiode which provides position information. Amplification is used to increase the standoff distance over which the new systems and methods can operate. It has also been found that microchannel plate amplifiers can be equipped with gating circuitry rapidly to disable their response, i.e., <5 nanoseconds from full off to full on. With these new systems and methods, one can obtain detailed range resolution, while ameliorating the effect of scattered light thereby critically increasing the distance over which useful determinations can be made.

In a second embodiment, backscattered light may be minimized by reducing the field of view of the detector lens so that the common volume defined by the laser illumination and the detector field of view (FOV) is restricted and therefore overlaps at increased range with respect to the detector. In this manner, backscattered photons, which are in number proportional to the common overlap volume, are reduced in comparison to systems employing a large FOV, e.g., as in the above discussion first embodiment. In addition, the position of the common overlap volume is further removed from the detector lens than the positions of backscattered light and, thus, the backscattered light intensity is reduced in comparison to the intensity of the light reflected from the measured surface by water attenuation and known range attenuation effects.

The narrow FOV is accomplished by synchronous scanning of the detector's FOV and the laser illumination beam. Imaging systems conducted in this manner as known as "synchronous scan" imagers and are commercially available. In accordance with the second embodiment of the invention, the synchronous scanning principle is used to reduce backscattered light reaching the detector, that preferably a PSD per se or a PSD in combination with an image intensifier. Unlike known synchronous scan systems, the new scan systems of the invention, the second embodiments of the invention comprise a PSD that provides position information of the reflected light returned from the observed surface to enable triangulation to be performed in accordance with the invention.

Implementation of the new methods of the invention provide real-time video frame rate volumetric surveys that can be used to characterize the size and shape of a variety of undersea objects. In addition, 3D information obtained in successive scans can provide velocity vectors necessary for station keeping and navigation.

BRIEF DESCRIPTION OF THE DRAWINGS

A more complete understanding of the invention can be obtained by reference to the accompanying drawings in which:

FIG. 2 is another diagrammatic illustration of a three dimensional mapping system of the invention.

FIG. 3 is a schematic of a simplified equivalent amplifier circuit of a mapping system of the invention.

FIG. 7 is a diagrammatic illustration of the submarine module of the mapping system of FIG. 1.

FIG. 8 is an enlarged isometric view of a two-dimensional position sensing diode used as a component of the sensor system of a mapping system of the invention.

FIG. 9 is a schematic of an intensifier arrangement for the mapping systems of the invention.

DESCRIPTION OF PREFERRED EMBODIMENTS

Figure 1:
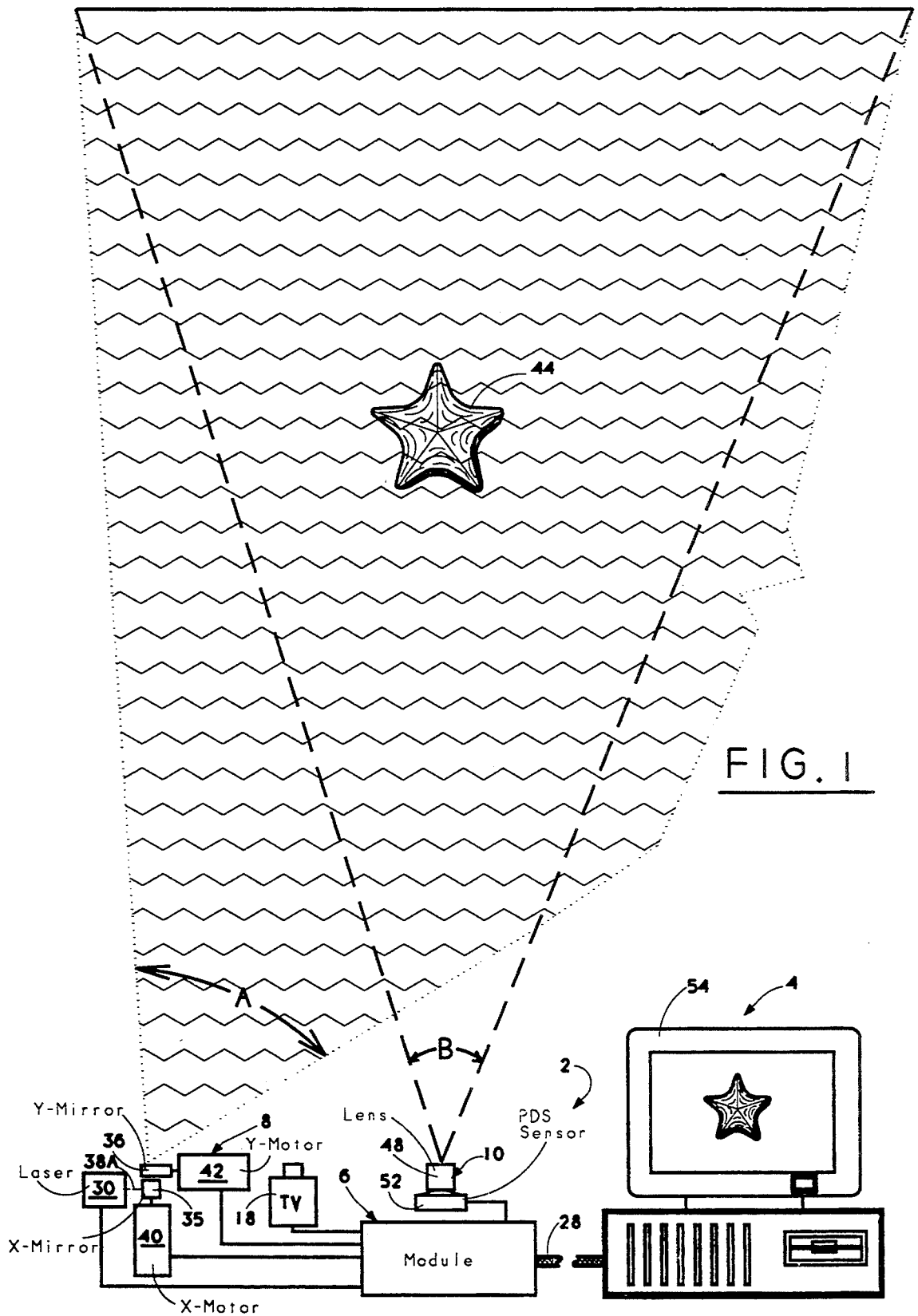
FIG. 1 is diagrammatic illustration of a 3D mapping system constructed in accordance with the invention.

Referring in detail to the drawings, the 3-D mapping system 2 basically comprises a topside laboratory module 4 and a downside instrument module 6 containing as components:

Laser/Scanning Assembly 8,
Sensor Assembly 10,
ADC/Signal Processing/DAC board 12,
Downside CPU 14, and
Communication unit 16.

Advantageously, another downside component may be a relative position TV unit 18.

There are two housings in the module 6, namely, housing 20 containing laser power supply 21 and instrumentation housing 22. Housing 20 has a 3 pin connector 24 to bring 110 VAC into the power supply 21 and housing 22 has a 3 pin connector 25 to bring in 110 VAC.

Housing 20 connects to the housing 22 via cable 26 to conduct the power and control signals required by the laser assembly 8. A twelve conductor cable 28 connects module 6 with the module 4.

The laser power supply 21 is a prepackaged, off the shelf unit, adjusted to the exact requirements of the specific laser 30. This laser/power supply combo is a matched set. If it becomes necessary to replace or repair one or the other of these units, they should be readjusted as a set to obtain optimum performance.

Three separate switches (not shown) are required for safety reasons to turn the laser beam on. A key switch, a reset switch and a remote interlock to prevent the laser from lasing unexpectedly in a remote situation. The interlock is wired to a safety interlock in the housing 22 to turn the laser off as the instrument rail 31 is removed from housing 22.

The components of the laser/scanning assembly 8 include laser 30 providing in excess of 140 mV, a Bragg cell acousto-optic modulator (AOM) or other type of light shutter 32, an adjustable mirror 33, a fixed mirror 34, a pair of moveable mirrors 35 & 36 to scan the optical path 38, a convergence lens 39, and a two-dimensional galvanometer scanning unit capable of covering a nominal 80°×80° angular field including an X motor 40 with its controller 41 and Y motor 42 with controller 43.

As illustrated in FIG. 1, the laser beam 38 is scanned through an angle "A" across subjects, e.g., object 44, within the field of view "B" of the sensor assembly 10 from a position to the left thereof. All of the 60° covered by the angle "A" is required to include both the 0.5 m and 2.5 m fields of view "B".

Figure 5:
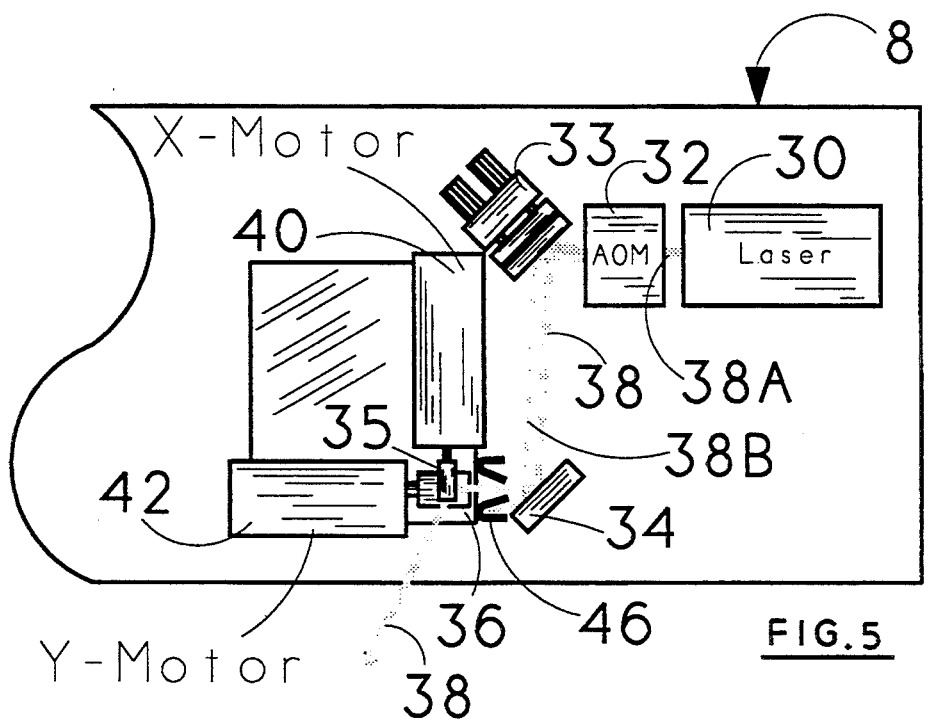
FIG. 5 is a plan view of the laser scanning component of the new mapping systems.
Figure 6:
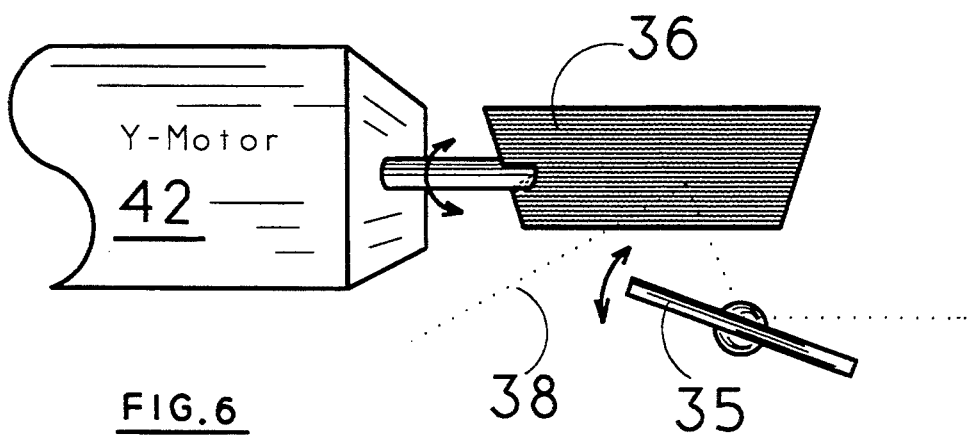
FIG. 6 is a fragmentary, enlarged, lateral view of the x & y mirrors of the scanning component of FIG. 5.

Further, as shown in FIG. 5, the beam 38A from laser 30 on passage through the AOM 32 splits into a first order beam 38 and a zero order beam 38B. By adjustment of the mirror 33, the beam 38B on reflection from mirror 34 is terminated by the barrier 46 while beam 38 continues on to mirrors 35 & 36 to exit the housing 22 through the lens 39. The motors 40 & 42 driven by the controllers 41 & 43 respectively manipulate the mirrors 35 & 36 to create the desired raster scan of the beam 38.

The laser 30, e.g., an ADLAS ™ model#DPY 325c, produces ~160 mW of power at 532 nm wavelength. It is provided with a built in manual beam attenuator (not shown). The two X-Y mount galvanometer motor driven mirrors 35 & 36 are obtainable from Cambridge Technologies and the drive electronics 41 & 43 to control them. This assembly scans off axis to the right in order to cover the field of view of the sensor assembly 10 (see FIG. 1). It is capable of a nominal 60° optical deflection, and is positioned as close to the outer wall of the housing 22 as possible in order to allow the widest possible coverage.

The light reflecting from object 44 is received by the sensor assembly 10 that comprises an imaging lens 48, e.g., a Canon FD 24 mm f/1.4 wide angle lens, behind housing window 50, position sensing diode (PSD) sensor 52, and amplifier 54. The lens 48 must image the entire field of view "B" onto the PSD 52, and collect enough light from the object 44 to ensure adequate signal to noise ratio at the output of the amplifier. The dimensions of the active area of the sensor assembly 10 make it a good match for standard 35 mm photographic lenses.

The basic function of PSD 52 (see FIG. 8) draws from the fact that any current flow from the X terminals, on the top of the substrate, to the Y terminals, on the bottom, is impeded by the substrate until light falls on the diode. Photons striking the surface open a conductivity channel that allows passage of the current from X to Y. The amount of current flowing from each X terminal is determined by both the intensity of the light and the proximity of the photons to that particular terminal. The Y terminals sink the total current coming through in a similarly proportional manner. This proportionality when normalized for the intensity, or total current, gives a very accurate indication of the location (centroid) of whatever light is falling on the sensor at that instant.

The PSD 52 provides four outputs. These signals indicate the location of the reflected dot on the sensor for X and Y axis. The raw signals however are very small and have an intensity dependence as well as a positional dependence. They are first amplified and then normalized to the total PSD output current in order to isolate the positional information. The amplification occurs within the sensor assembly 10, but the normalization occurs after digitizing the amplified analog voltages, via pipeline processing on the ADC/Processing/DAC board 12.

The linearity and precision of diode 52 permit detection of changes in position on the order of 1 in 10,000. The output signal level of the diode is dependent on both the intensity of the incident light and the integration time allowed to collect the charge resulting from the X or Y axes photocurrent. Use of PSD 52 to record reflected light imposes difficulty in achieving adequate signal level for any given laser power, but whatever light level reaches the sensor assembly 10, the requirements of a specific frame acquisition time ultimately define the signal level and dynamic operating range of amplifier 56 (FIG. 3). Even with the use of a laser in the 160 mW power class, an integration time sufficiently brief to permit 200 lines of 200 samples within 4 seconds reduces the signal levels to a point near the background noise level of the sensor.

In accordance with the invention, the signal amplifier unit 56 used to process the output of the diode 52 includes the amplifier 58 with lead 60 from a pre-amp in sensor assembly 10, lead 64 to ADC board 12, amplifier 66, capacitor 68, resistor 70 and electronic switch 72.

A preferred embodiment of the invention includes image intensifier means 74 that comprises image intensifier 76 having inlet surface 78 and a phosphor layer 80 on its exit surface 82, power supply plus gain control means 84 and coupler assembly 86 relatively positioned as shown in FIG. 9. Advantageously, means 84 will contain a time gating circuit and assembly 86 comprises a lens or optical fiber coupling unit.

The ADC/Signal Processing/DAC board 12 (FIG. 7) permits a single line scan to occur at hardware speeds. It coordinates the process of scanning each line, provides all of the signals required of the sensor amplifier, performs four analog to digital conversions in parallel (one channel for each PSD output), and carries out pipelined mathematical functions on the digital values to convert the signals from the PSD outputs into position-only information. It then stores the results in a FIFO for transfer to the CPU 14.

The CPU 14 is a 486/33 ISA single board computer that translates the simple command/parameter information coming from module 4 into the complex, task-specific sequence of events that constitute a frame scan.

As an example, if the user issues a command to grab a single frame at 0.2° lateral resolution, a single short command is transferred from the topside module 4 to CPU 14. This causes a sequence of events. First, CPU 14 programs the sample map with a pattern that will take 200 samples from left to right over the field of view of the sensor assembly 10. Then, the mirror 35 is positioned at the specific angle ($\theta_y$) to scan the first line and such line scan is commenced. Each sample on that line creates a set of X and Y coordinates showing the position of the reflected dot on the PSD sensor 52. This information is stored in a FIFO on the board 12 until retrieved by CPU 14. When the board 12 indicates that it is finished acquiring the current line, the CPU 14 repositions the vertical mirror 36 by a given increment, e.g., equal to 1/200 of the FOV, and starts the next line scan. The CPU 14 then takes each data point from the FIFO in order and sends it to the communication buffer 16 to be sent up to module 4 or the surface where distances are triangulated, and data points placed in the graphics display 54. Meanwhile, CPU 14 checks the board 12 to find out if the next line of data is ready to be transferred. In this manner, 200 lines are scanned, transferred topside, processed, and displayed.

For higher resolution, module 4 may send down a different command which the CPU 14 interprets before simply changing the sample map and line increment to reflect the new resolution.

The communication unit 16 is a pair of semi-autonomous RS-485 communication cards running half duplex along a pair of twisted shielded pairs in cable 28. One pair carries the clock used to synchronize transfers. The other carries the handshake signals.

The topside module 4, receives raw data from module 6, triangulates the Z values, and provides the user with an interface and high resolution graphics display 54.

For proper operation of the signal amplifier 56 during the DC restore segment of a scan line, it is necessary to turn the laser beam "off". Thus, as the laser beam 38A leaves the laser 30, it passes through the AOM 32. This device is based on a Bragg cell defractor (not shown). The fourth bit of the sample map constitutes a signal to the AOM to modulate (1) or not (0). While the AOM is modulating it diffracts the input laser beam into a number of diverging output beams which are labeled according to the extent of their divergence from the original beam. The original beam is called the Zero order. The beams immediately to either side are called the First order and minus First order. With no modulation signal driving AOM 32, the zero order is the only beam exiting the Bragg cell. As long as a modulation signal is being applied, the original beam is split. This property is exploited by arranging the angles of the various optical elements in the scanning assembly such that the first order (which appears only during modulation) falls on the X mirror 34 and is thus projected out of the housing 22. All of the other orders, including the zero order are caught by barrier 46, both during modulation and not. Hence, during modulation (a "1" in the sample map) there is a beam (first order) exiting the housing 22. The intensity of this beam can be maximized relative to the other beams for the best results. The dimensions of laser 30 with respect to the necessary position of the scanner mirrors 35 & 36, dictate that the optical path of the beam be folded by mirrors 33 & 34 prior to scanner mirrors 35 & 36. The aperture in barrier 46 is fixed to direct the proper diffraction order at one position on the X mirror. Proper adjustment of the mirrors 33 & 34 requires only that the first order beam 38 be directed through this aperture. The cone of barrier 46 (pointing toward mirror 34) is designed to deflect the majority of the light from the remaining orders as a light trap.

As the laser dot scans across any subject in the field of view "B", the image of the dot is focused onto position-sensitive detector 52 that is biased such that current flows into the two terminals $X_1$ & $x_2$ (FIG. 8) and out of the two terminals $Y_1$ & $Y_2$.

The total current flowing through diode 52 is proportional to the light intensity (plus a dark current). The splitting of the current into the X terminals is a function of the vertical position of the image dot on the diode surface. Similarly, the splitting of the current out of the Y terminals is a function of the horizontal position of the dot on the sensor. The positional information independent of brightness is calculated as:

$$H \text{ position} = \frac{Y_1 - Y_2}{Y_1 + Y_2} \quad V \text{ position} = \frac{X_1 - X_2}{X_1 + X_2}$$

The nominal peak signal current at any terminal, e.g., 60 (FIG. 3), is found to be approximately 400 nA. The required dynamic range of the instrument is on the order of 10 bits, the input equivalent noise should therefore not exceed 400 pA. To meet this requirement, dual current-integrating op-amp 58 is employed, along with careful shielding and filtering practices. The amp 66 integrates all of the sensor current over the sample interval, then copies the voltage representing the integrated current onto holding capacitor 68, finally resetting the integrator by dumping the charge held on the integration capacitor.

The signal which controls the integration process timing is generated on the ADC board 12 under software control according to the scan positions to be sampled.

The op-amps 58 & 66 and associated components comprise two low-pass filters, for noise reduction, and antialiasing filtering for sampling rates above 30 kHz.

Because the signal voltage required for proper operation of the ADC board 12 is about 5 to 6 volts, each channel is configured for a gain to provide about 5.5 peak signal. These stages drive the coaxial cables to the ADC board 12 directly through the wire 64.

As the PSD 52 dark current is of the same order of magnitude as the peak-to-peak signal current, and because circuit offset drift can be significant at low signal levels, it is advantageous to employ a keyed dc restorer. The dc restorer uses FET switch 72 to sample the signal at the output under control of the downside processor 14 when the sensor is not exposed to light. The sampled value is referenced to 0 V, and a dc correction is applied to the gain stage to ensure that 0 light produces 0 V. This loop has enough dc gain to ensure an accurate "black" level. It is also important to select a time constant that is fast enough to keep up with any anticipated drift, but not too fast, as the black clamping will then sample-in more noise.

Also, bandwidth exceeding one-half the clamping rate would not be useful, as dark level variations at the higher frequencies could not be tracked and would produce alias frequency variations in the dark level.

The typical clamp interval is 16 samples out of 256. The typical clamp rate is 50 Hz for a 4-second 200 line scan.

The voltage outputs of the preamplifier in sensor assembly 10 are 10 times the dark signal voltages as would be measured at the pre-amp outputs.

Terminals X1 and X2 of the PSD 52 are the current input terminals and are biased positively with respect to the Y1 and Y2 terminals. In this design, this bias voltage is established at 10 volts with the precision voltage reference at 8 v.

Op amps 58 and 66, one for each channel X and Y, with associated components, comprise two transimpedance amplifiers that convert the signal currents at terminals X1 and X2 into voltages measured at lead 64. At nominal signal currents of 400 nA peak to peak, the signal voltages at these test points will be 200 mV peak to peak. Wide band op amps are employed to minimize high frequency transients in the PSD bias that may be caused by rapidly changing signal currents.

As the vertical position data is only to be used for calibration, very slow scanning can be used. Therefore, the transimpedance amplifiers for the vertical axis are limited to approximately 3 kHZ bandwidth to improve the signal to noise ratio of the vertical position value.

The processing board 12 design is an ISA compatible board responsible for (a) sampling the Pre Amp, (b) converting the input voltages into 12-bit digital words on four parallel channels, (c) processing the signal in order to normalize for intensity, and (d) buffering the resulting X,Y sensor position for use by the CPU 16 in making range computations.

Under user control it also (1) controls the placement and extent of the scan within the field of view, (2) controls the sample frequency, (3) provides the timing signals required by the integrating pre-amp, and (4) maintains synchronization of the whole operation with the 33 MHz CPU clock.

To accomplish a line scan it is only necessary to write directly to the registers aboard the ADC/Processing-/DAC board 12, whose function is determined through the use of two memory arrays and four registers.

The module 4 is a "marinized", shock-mounted 486/33 CPU that is water tight to three feet of depth. It has 16 Mbytes of RAM; 1 parallel port; 2 RS-232 comm ports; 1 RS-485 comm port; 300 MByte SCSI hard drive; dual 3½" floppy disk drives; a VGA graphics controller, and an IRIS VISION graphics board set.

A 17" Viewsonic monitor 54 supports the high resolution graphics (1280×1024) provided by the IRIS VISION hardware. A keyboard and mouse (not shown) round out the hardware elements.

The lab module provides the user interface for the system, sends commands to the down-side instrument, receives the sensor position data for each frame, and processes this data into Z values for the graphics display.

The Z values are determined in a step of converting differential voltages and range value voltages into a visual representation of the surface under study in accordance with the following equations, wherein $K_1+K_2$ is the non-zero separation between the scanner and detector (see FIG. 4) and f is the focal length of the lens 48:

$$\frac{K_1}{Z} = \frac{x}{f} \rightarrow K_1 = Z\left(\frac{x}{f}\right)$$

$$\tan\theta = \frac{Z}{K_2} \rightarrow K_2 = \frac{Z}{\tan\theta}$$

$$K_1 + K_2 = Z\left(\frac{x}{f}\right) + Z\left(\frac{1}{\tan\theta}\right)$$

$$Z = \frac{(K_1 + K_2)}{x/f + 1/\tan\theta}$$

Figure 4:
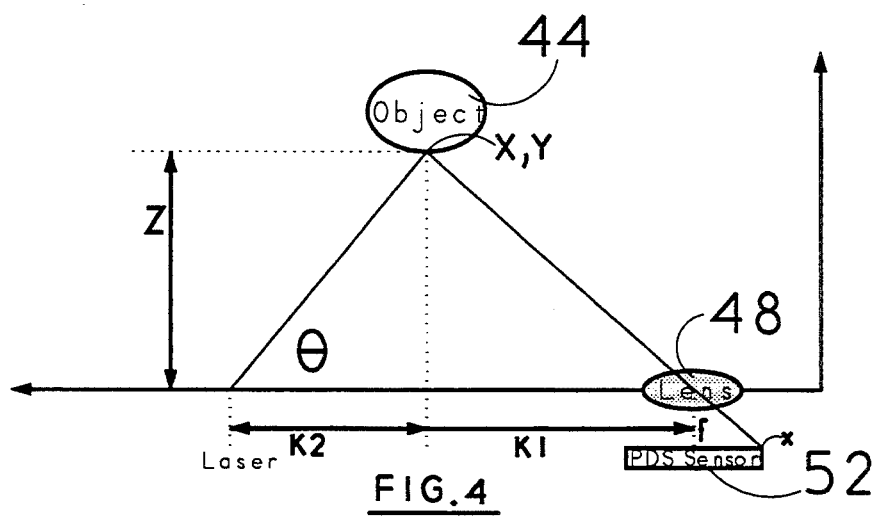
FIG. 4 is a graphical representation of components of the new mapping systems and their positional relationships to one another and to a submarine object being mapped.

The parameter x in the formula specifying Z is the derived coordinate associated with the X-axis on the detector 52 surface. The angle $\theta$ is the X axis scan angle as indicated in FIG. 4. Thus, Z is calculated for each sample which is, in turn, associated with a unique value of $\theta_x$ for each scan point of the horizontal scan mirror for each scan line. The Y coordinate of each point is calculated on the basis of the known angle $\theta_y$ of the vertical scan mirror for each scan line Location of the surface point, from which the laser beam is reflected, in (X, Y, Z) coordinates are then obtained by trigonometric calculation from coordinates pairs ($\theta_x$, $\theta_y$, Z).

Figure 10:
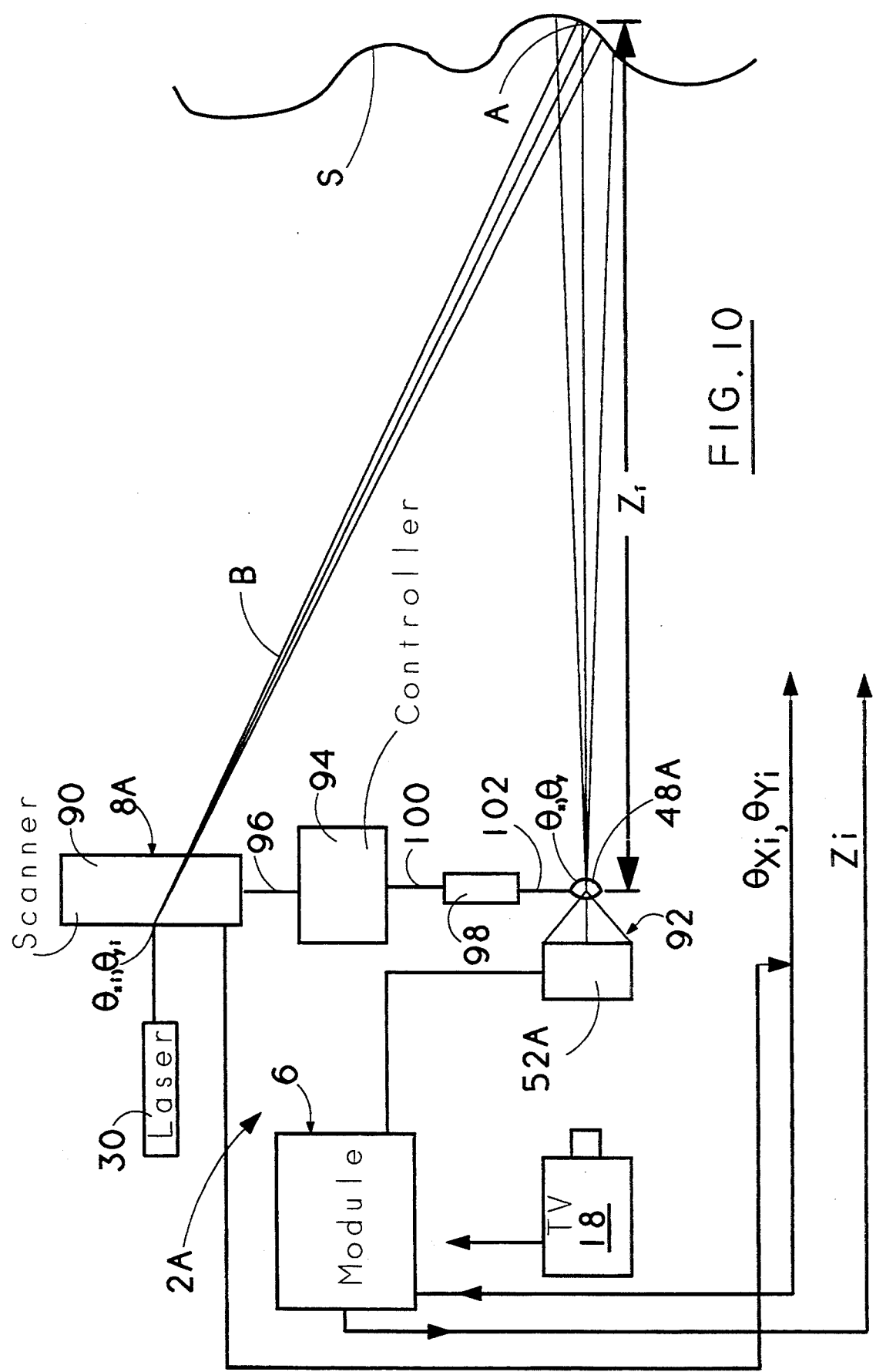
FIG. 10 is a diagrammatic illustration of another embodiment of a three dimensional mapping system of the invention that employs synchronous scanning.

With reference to FIG. 10, the 3-D mapping system 2A differs primarily from the embodiments of system. 2 supra in the use of a laser synchronous scanning assembly 8A in place of the laser/scanning assembly 8 of system 2 and synchronous scan sensor unit 92 in place of the fixed position sensor unit 10. In accordance with known arrangements in synchronous scanners, the FOV of lens 48A is very limited in size as compared with the FOV of lens 48 (FIG. 2) so the area addressed by detector means 92, comprising compound lens 48A and PSD 52A, is synchronized to the movement of beam B so it focuses on the approximate $X_i$, $Y_i$ position on measurement surface S being currently illuminated by the beam B so PSD 52A receives the reflected image to determine the range $Z_i$ of only the small illuminated area A. Components in the scanning assembly 8A to accomplish this comprise a scan controller 94 to which scanner 90 is linked by cable 96 and a driver 98 linked to controller 94 by cable 100. Driver 98 synchronously moves detector means 92 via linkage 102.

We claim:

1. A system for three dimensional mapping of a submarine surface which comprises:

a light source for projecting a beam of collimated light that is reflective from said submarine surface including a laser, scanning means to intercept said beam and project it in a first direction onto a selected area of said surface forming thereon a raster of pixels each with controlled X and Y coordinates and thereby produce a reflection of said raster in a second direction, scanner processor means to control said X and Y coordinates, focus means capable of intercepting said raster reflection and focusing it as a scan image on a reception plane offset spatially from said scanning means, a position sensitive photodiode assembly defined by a photoreceptive planosurface, said planosurface being positioned substantially on said reception plane to sense said scan image and said assembly being capable of converting each pixel of said reflected raster into a pair of differential currents corresponding to the X and Y coordinates of said each pixel received on said planosurface, signal processor means to calculate by triangulation from said differential currents range value voltages for said pixels, and graphic display means to convert said range value voltages into a visual representation of said surface.

2. The system of claim 1 that further comprises an NTSC video camera capable of viewing said selected area of said submarine surface to provide a visual reference thereof.

3. The system of claim 1 wherein said beam is continuous.

4. The system of claim 1 wherein said beam is temporally pulsed.

5. The system of claim 1 wherein said light source includes means to confine the cross-sectional area of said beam.

6. The system of claim 1 wherein said scanning means comprises a first mirror and first motor means to move said first mirror to cause said beam to move stepwise into a series of horizontal positions.

7. The system of claim 6 wherein said scanning means comprises a second mirror and second motor means to move said second mirror to cause said beam to move stepwise into a series of vertical positions.

8. The system of claim 1 wherein said position sensitive photodiode assembly comprises intensifier means.

9. The system of claim 8 wherein said intensifier means is a 1st, 2nd or 3rd generation image intensifier or combination thereof.

10. The system of claim 8 wherein said intensifier is a gated image intensifier.

11. The system of claim 8 wherein said intensifier is a non-gated image intensifier.

12. The system of claim 1 wherein said scanning means is a synchronous scan device.

13. A method for three dimensional mapping of a submarine surface which comprises:
    emitting from a light source a beam of collimated light that is reflective from said submarine surface,
    intercepting said beam and projecting it at a first position in a first direction onto a selected area of said surface as a raster of pixels each with controlled X and Y coordinates to thereby produce from said surface a reflection of said raster in a second direction,
    at a second position offset spatially from said first position, focusing said reflection of said raster onto a reception plane,
    causing each pixel of said reflection of said raster focused on said reception plane to produce a pair of differential currents corresponding to the X and Y coordinates on said reception plane of said each pixel,
    calculating from said differential currents range value voltages for said pixels, and
    converting via triangulation said range value voltages into a visual representation of said surface.

14. The method of claim 13 wherein said calculation step is conducted in accordance with the following formulae:

$$\frac{K_1}{Z} = \frac{x}{f} \rightarrow K_1 = Z\left(\frac{x}{f}\right)$$

$$\tan\theta = \frac{Z}{K_2} \rightarrow K_2 = \frac{Z}{\tan\theta}$$

$$K_1 + K_2 = Z\left(\frac{x}{f}\right) + Z\left(\frac{1}{\tan\theta}\right)$$

$$Z = \frac{(K_1 + K_2)}{x/f + 1/\tan\theta}$$

and wherein:
   Z is the value sought by the calculation,
   x is the derived coordinate associated with the X-axis on said reception plane,
   H is the angle of said spatial offset of said second position from said first position,
   f is the focal length of said focusing. and
   $K_1 + K_2$ is the non-zero separation between said first position and said second position.

15. The method of claim 13 wherein the field of view of said focusing at said second position is a minor portion of said selected area and is synchronized with said projecting at said first position.

16. The method of claim 13 wherein said triangulation involves determining the deviation between the actual position of said each pixel on said reception plane and a predetermined reference position on said reception plane.

* * * * *